US 6,705,170 B2

(12) United States Patent
Florin

(10) Patent No.: US 6,705,170 B2
(45) Date of Patent: Mar. 16, 2004

(54) MAGNETOINDUCTIVE FLOWMETER

(75) Inventor: Wilhelm Florin, Duisburg (DE)

(73) Assignee: Krohne Messtechnik GmbH & Co. KG (DE)

( * ) Notice: Subject to any disclaimer, the term of this patent is extended or adjusted under 35 U.S.C. 154(b) by 6 days.

(21) Appl. No.: 10/193,793

(22) Filed: Jul. 12, 2002

(65) Prior Publication Data

US 2003/0015042 A1 Jan. 23, 2003

(30) Foreign Application Priority Data

Jul. 20, 2001 (DE) .......................... 101 34 672

(51) Int. Cl.[7] ................................. G01F 1/58
(52) U.S. Cl. ................................. 73/861.12
(58) Field of Search ...................... 73/861.12, 861.17, 73/861.18, 861.13, 861.15, 861.16

(56) References Cited

U.S. PATENT DOCUMENTS 5,377,128 A * 12/1994 McBean ............... 702/91
5,469,746 A * 11/1995 Fukunaga et al. ..... 73/861.12
5,905,206 A * 5/1999 Herwig et al. ........ 73/861.12

FOREIGN PATENT DOCUMENTS

EP            0 548 439 A1    12/1991

* cited by examiner

Primary Examiner—Edward Lefkowitz
Assistant Examiner—Jewel V. Thompson
(74) Attorney, Agent, or Firm—Cesari and McKenna, LLP

(57) ABSTRACT

A magnetoinductive flowmeter for moving fluids, incorporating a sensor unit and a processing and power supply unit, the sensor unit encompassing a measuring tube, field coils which serve to generate a periodically alternating magnetic field in a direction at least essentially perpendicular to the axis of the measuring tube, and two measuring electrodes positioned along a line that extends at least essentially in a direction perpendicular to the axis of the measuring tube and perpendicular to the vector of the magnetic field, with field-coil feed lines connecting the field coils of the sensor unit to the processing and power supply unit. The sensor unit encompasses a sensor-data memory module in which specific parameters of the sensor unit are stored and from which the stored specific parameters can be transferred to the processing and power supply unit. This permits the simple adaptation of an existing sensor unit to a new processing power supply unit or vice versa.

10 Claims, 1 Drawing Sheet

MAGNETOINDUCTIVE FLOWMETER

BACKGROUND OF THE INVENTION

This invention relates to a magnetoinductive flowmeter for moving fluids, incorporating a sensor unit and a processing and power supply unit, said sensor unit encompassing a measuring tube, field coils which serve to generate a periodically alternating magnetic field in a direction at least essentially perpendicular to the axis of the measuring tube, and two measuring electrodes positioned along a line that extends at least essentially in a direction perpendicular to the axis of the measuring tube and perpendicular to the vector of the magnetic field, with field-coil feed lines connecting the field coils of the sensor unit to the processing and power supply unit.

Magnetoinductive flowmeters of the type referred to above have been well-known for some time and have been widely employed in a variety of applications. The basic concept of a magnetoinductive flowmeter for moving fluids goes back to Faraday who in 1832 proposed the application of the principle of electrodynamic induction for measuring flow rates. According to Faraday's law of induction a moving fluid that contains charge carriers and flows through a magnetic field will develop an electric field intensity in a direction perpendicular to the flow direction and perpendicular to the magnetic field. A magnetoinductive flowmeter makes use of Faraday's law of induction in that a magnet, usually consisting of two magnetic poles each with a field coil, generates a magnetic field perpendicular to the direction of the flow through the measuring tube. Within this magnetic field each volume element of the fluid passing through it and containing a certain number of charge carriers contributes its field intensity generated in the volume element concerned to a measuring voltage that can be collected via measuring electrodes.

In prior-art magnetoinductive flowmeters, the measuring electrodes are designed to make either conductive or capacitive contact with the moving fluid. A salient characteristic of magnetoinductive flowmeters is the proportionality between the measuring voltage and the flow velocity of the fluid averaged across the diameter of the measuring tube, i.e. between the measuring voltage and the volume rate.

As stated above, the magnetoinductive flowmeter incorporates a sensor unit as well as a processing and power supply unit. This means that the sensor unit and, respectively, the processing and power supply unit are two distinctly separate entities. The essential elements of the sensor unit are the measuring tube, the field coils and the measuring electrodes, i.e. the components needed to generate and quantify the measuring effect. The processing and power supply unit serves the purpose of feeding power to the field coils and evaluating the measuring effect, meaning the voltage induced between the measuring electrodes.

For the processing and power supply unit to perform a quantitative evaluation of the voltage induced between the measuring electrodes, i.e. the ultimate determination of the flow rate of the fluid passing through the measuring tube, it must know the specific parameters of the sensor unit. In prior-art magnetoinductive flowmeters, these specific parameters of the sensor unit are routinely stored in the processing and power supply unit, for instance in and EEPROM (electrically erasable and programmable read-only memory) installed in the processing unit. Whenever an existing processing and power supply unit is to be used in conjunction with a new sensor unit, it is necessary to reload the specific parameters of the sensor unit in the EEPROM of the processing and power supply unit. The specific parameters of the sensor unit are typically indicated on the name plate attached to the sensor unit, so that these specific parameters can be entered manually. That, however, is a fairly time-consuming and relatively error-prone process. This becomes a major factor when, as is likely, more and more specific sensor-unit parameters need to be entered as time progresses.

To solve that problem, magnetoinductive flowmeters have been developed whose processing and power supply units are equipped with several EEPROMs, with one particular EEPROM assigned to exclusively contain the specific parameters of the sensor unit. Whenever an existing sensor unit is to be used in combination with a new processing and power supply unit, only the EEPROM in which the specific parameters of the sensor unit are stored needs to be exchanged. But if an existing processing and power supply unit is to be used with a new sensor unit, the specific parameters must still be entered manually.

It is therefore the objective of this invention to introduce a magnetoinductive flowmeter of the type described, in which the combination of a sensor unit and a processing and power supply unit is made easy.

SUMMARY OF THE INVENTION

The magnetoinductive flowmeter according to the invention which achieves this objective based on the type of magnetoinductive flowmeter referred to above, is characterized in that the sensor unit is provided with a sensor-data memory module in which the specific parameters of the sensor unit are stored and from which the stored specific parameters can be transferred to the processing and power supply unit.

This means that, according to the invention, the sensor-data memory module is physically separated from the processing and power supply unit where the specific parameters of the sensor unit, stored in the sensor-data memory module, are needed. The sensor-data memory is now housed in the sensor unit itself, the sensor unit thus always "carries with it" its specific parameters, and by virtue of the transferability of the specific parameters to a processing and power supply unit to which the sensor unit is connected, it is possible at any time to easily adapt an existing sensor unit to a new processing an power supply unit and vice versa, without requiring the manual loading of the specific sensor-unit parameters.

In an enhanced embodiment of the invention, the sensor-data memory module includes both a data memory and a control circuit for the data memory. Particular preference for the data memory of the sensor-data memory module is given to an EEPROM.

There are various ways in which the sensor-data memory module can be connected to the processing and power supply unit. However, in a preferred implementation of the invention the sensor-data memory module is connected to the processing and power supply unit via the field-coil feed lines.

It is possible, of course, to transfer the specific parameters stored in the sensor-data memory module to the processing and power supply unit via dedicated lines or by way of the lines that serve to carry the measuring voltages induced between the measuring electrodes to the processing and power supply unit. In a preferred embodiment of the invention, however, the stored specific parameters can be transmitted from the sensor-data memory module to the processing and power supply unit via the field-coil feed lines. The particularly preferred transfer mode for the specific parameters is in the form of voltage modulations.

In preferred implementations of this invention, the sensor-data memory module may be connected in parallel or in series with the field coils. In the case of a series connection with the field coils, the sensor-data memory module should preferably have low impedance during the operation of the field coils with an alternating magnetic field. This minimizes both the power dissipation in the sensor-data memory module and any effect on the field-coil circuitry. Conversely, if the sensor-data memory module is parallel-connected with the field coils, the sensor-data memory module should preferably have a high impedance level during the operation of the field coils with an alternating magnetic field, for the same beneficial effects.

Finally, to ensure highly universal applicability of the sensor unit, a preferred embodiment of the invention provides for the sensor-data memory module to be produced employing high-temperature technology. This permits the use of the sensor-data memory module even at very high temperatures and specifically in connection, for instance, with very hot fluids.

BRIEF DESCRIPTION OF THE DRAWINGS

There are numerous ways in which the magnetoinductive flowmeter according to this invention can be configured and further enhanced. Corresponding variations are specified in the dependent claims, and in the following description of preferred embodiments of the invention, making reference to the attached drawings, in which:

DETAILED DESCRIPTION OF AN ILLUSTRATIVE EMBODIMENT

Figure 1:
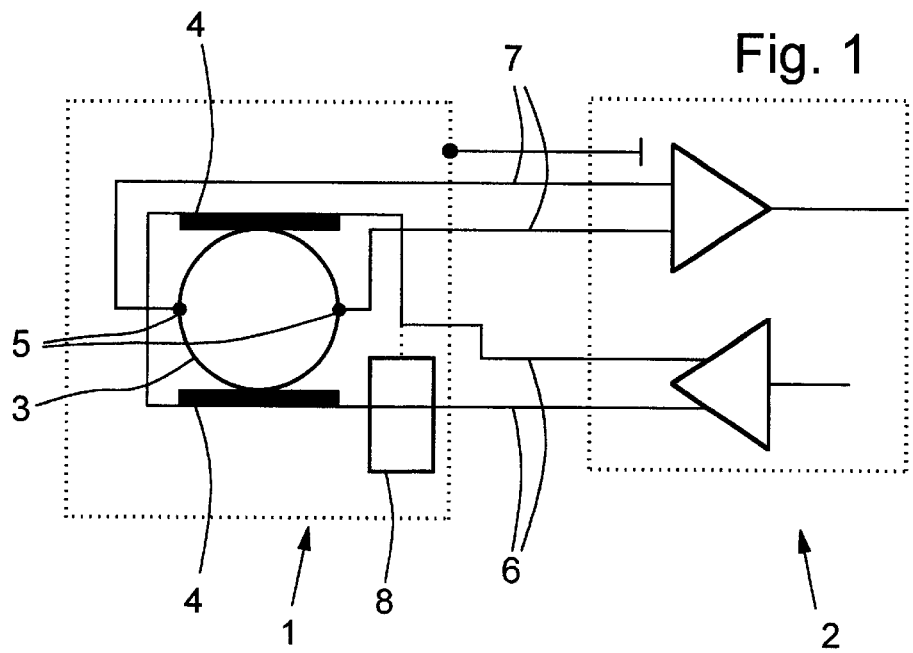
FIG. 1 is a diagrammatic view of the architecture of a magnetoinductive flow-meter according to a preferred embodiment of the invention.

FIG. 1 shows in diagrammatic form the architecture of a magnetoinductive flow-meter according to a preferred embodiment of this invention. The magnetoinductive flowmeter encompasses a sensor unit 1 as well as a processing and power supply unit 2. The components of the sensor unit 1 include a partly outlined measuring tube 3, two field coils 4 and two measuring electrodes 5. During the operation of the magnetoinductive flowmeter according to the preferred embodiment of the invention illustrated, the field coils 4 generate a periodically alternating magnetic field, typically a clocked continuous field that extends in a direction essentially perpendicular to the axis of the measuring tube. This induces in the moving fluid a voltage that is collected via the measuring electrodes 5 positioned along a connecting line that extends perpendicular to both the axis of the measuring tube and the direction of the magnetic field. The field coils 4 connect to the processing and power supply unit 2 via field-coil feed lines 6. The measuring electrodes connect to the processing and power supply unit 2 via measuring-electrode lines 7.

Figure 2:
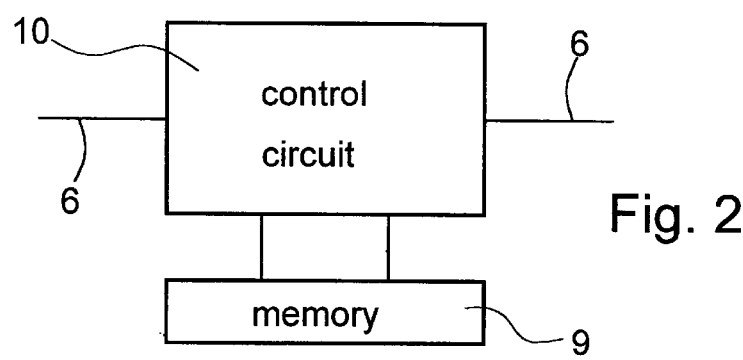
FIG. 2 depicts schematically a preferred embodiment of a sensor-data memory module according to the invention.

The sensor unit 1 contains a sensor-data memory module 8 in which specific parameters of the sensor unit 1 are stored. Specific parameters of the sensor unit 1 typically include in particular the dimensions of the magnetoinductive flowmeter such as the diameter of the measuring tube 3 as well as calibration constants. As is shown in the preferred embodiment of this invention according to 2, the sensor-data memory module 8 is composed of the memory 9 itself, that being an EEPROM, and a control circuit 10 for the memory 9. Again as shown in FIG. 2, the field coil feed lines 6 connect the sensor-data memory module 8 to the processing and power supply unit 2.

The dashed line in FIG. 1 shows how the sensor-data memory module 8 can be connected to the field coils either in a series or in a parallel configuration. In the case of a series connection of the sensor-data memory module 8 with the field coils 4, the sensor-data memory module 8 will have low impedance during the operation of the magnetoinductive flowmeter. These provisions ensure that the interpolation of the sensor-data memory module 8 in the field-coil feed lines 6 has as little effect as possible on the field-coil circuit by minimizing the power dissipation that occurs in the sensor-data memory module 8 in the case of a series-connection or that bypasses the field coils 4 in the case of a parallel-connected sensor-data memory module 8.

Figure 3:
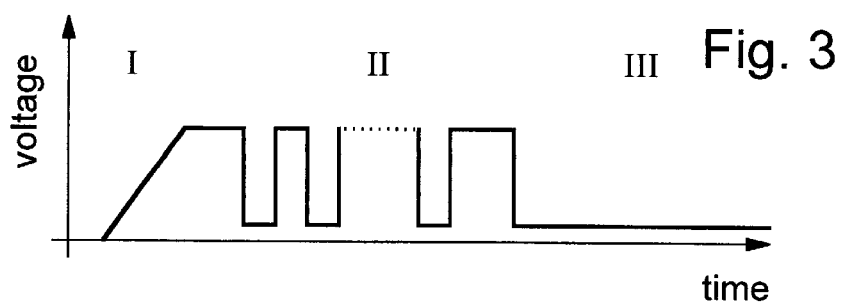
FIG. 3 shows schematically the sequence of events in a sensor-data memory module according to a preferred embodiment of the invention.

Finally, FIG. 3 is a schematic illustration of the mode of operation of the sensor-data memory module 8 in a preferred embodiment of this invention. When the system is powered up, the control circuit 10 of the sensor-data memory module 8 is activated. The supply voltage for the memory 9, typically an EEPROM, is generated. This is phase I in FIG. 3. After a defined length of time, the sensor-data memory module 8 transitions into the data transfer mode which is phase II in FIG. 3. In the data transfer mode, the specific parameters of the sensor unit 1, stored in the sensor-data memory module 8, are transferred to the processing and power supply unit 2. The data transfer takes place in the form of voltage modulations which are detected by the processing and power supply unit 2 and used as the basis for calculating the flow rate. Upon completion of the data transfer, the sensor-data memory module 8 automatically transitions into a state in which the field-coil circuit remains virtually unmodulated in that, depending on the type of connection of the sensor-data memory module 8, that circuit will have especially impedance (parallel connection) or especially low impedance (series connection). Of course, if a periodically alternating current is fed directly into the sensor unit 1, the specific parameters of the sensor unit that are stored in the sensor-data memory module 8 will not be transferred to the processing and power supply unit 2.

To permit universal utilization of the magnetoinductive flowmeter, including the operation of the sensor unit 1 under high-temperature conditions for instance due to hot fluids, the preferred embodiment for the invention as illustrated incorporates a sensor-data memory module 8 built under application of high-temperature technology.

What is claimed is:

1. A magnetoinductive flowmeter for moving fluids, incorporating a sensor unit and a processing and power supply unit, said sensor unit encompassing a measuring tube, field coils which serve to generate a periodically alternating magnetic field in a direction at least essentially perpendicular to the axis of the measuring tube, and two measuring electrodes positioned along a line that extends at least essentially in a direction perpendicular to the axis of the measuring tube, and perpendicular to the vector of the magnetic field, with field-coil feed lines connecting the field coils of the sensor unit to the processing and power supply unit, wherein the sensor unit contains a sensor-data memory module in which specific parameters of the sensor unit are stored and from which the stored specific parameters can be transferred to the processing and power supply unit, and wherein the sensor data memory module is connected to the processing and power supply unit via the field-coil feed lines.

2. The magnetoinductive flowmeter as in claim 1, wherein the sensor-data memory module includes a memory and a control circuit for the memory.

3. The magnetoinductive flowmeter as in claim 1, wherein the memory of the sensor-data memory consists of an EEPROM.

4. The magnetoinductive flowmeter as in claim 1, wherein the stored specific parameters can be transferred from the sensor-data memory module to the processing and power supply unit via the field coil feed lines.

5. The magnetoinductive flowmeter as in one of the claims 1 to 3, wherein the stored specific parameters can be transferred from the sensor-data memory module to the processing and power supply unit in the form of voltage modulations.

6. The magnetoinductive flowmeter as in one of the claims 1 to 3, wherein the sensor data memory module is connected in series with the field coils.

7. The magnetoinductive flowmeter as in claim 6, wherein during the operation of the field coils with an alternating magnetic field, the sensor-data memory module is at a low impedance level.

8. The magnetoinductive flowmeter as in one of the claims 1 to 3, wherein the sensor-data memory module is parallel-connected to the field coils.

9. The magnetoinductive flowmeter as in claim 8, wherein during the operation of the field coils with an alternating magnetic field, the sensor-data memory module is at a high impedance level.

10. The magnetoinductive flowmeter as in one of the claims 1 to 3, wherein the sensor-data memory module is produced under application of high-temperature technology.

* * * * *